J. G. MARCY.
Mechanical Motor.

No. 226,409.  Patented April 13, 1880.

Witnesses:

Inventor:
Jules G. Marcy,
per Boone & Osburn
attys.

UNITED STATES PATENT OFFICE.

JULES G. MARCY, OF SAN FRANCISCO, CALIFORNIA.

MECHANICAL MOTOR.

SPECIFICATION forming part of Letters Patent No. 226,409, dated April 13, 1880.

Application filed October 1, 1879.

*To all whom it may concern:*

Be it known that I, JULES G. MARCY, of the city and county of San Francisco, in the State of California, have invented a certain new and useful Improvement in Mechanical Motors; and I do hereby declare that the following is a full, clear, and exact description of my said invention, reference being had to the accompanying drawings.

My invention has reference to an improvement in mechanical motors for working pumps, driving light machinery, and other like purposes; and it relates more particularly to that class of motors wherein both springs and weights are employed to give continuous motion to a train of gears by which a crank-shaft or a driving-pulley is rotated.

The nature of my invention consists in combining and arranging, with the principal shaft or arbor of the driving mechanism, an auxiliary driver consisting of a drum having a means for locking it to and disengaging it from the principal shaft or its drum, and a weight for giving motion to said auxiliary drum, whereby one or both weights or drivers can be used at any time to give greater or less power or speed.

This auxiliary driver can be disconnected from the principal shaft or mechanism and wound up without interfering with the movements of the other parts.

Figure 1:
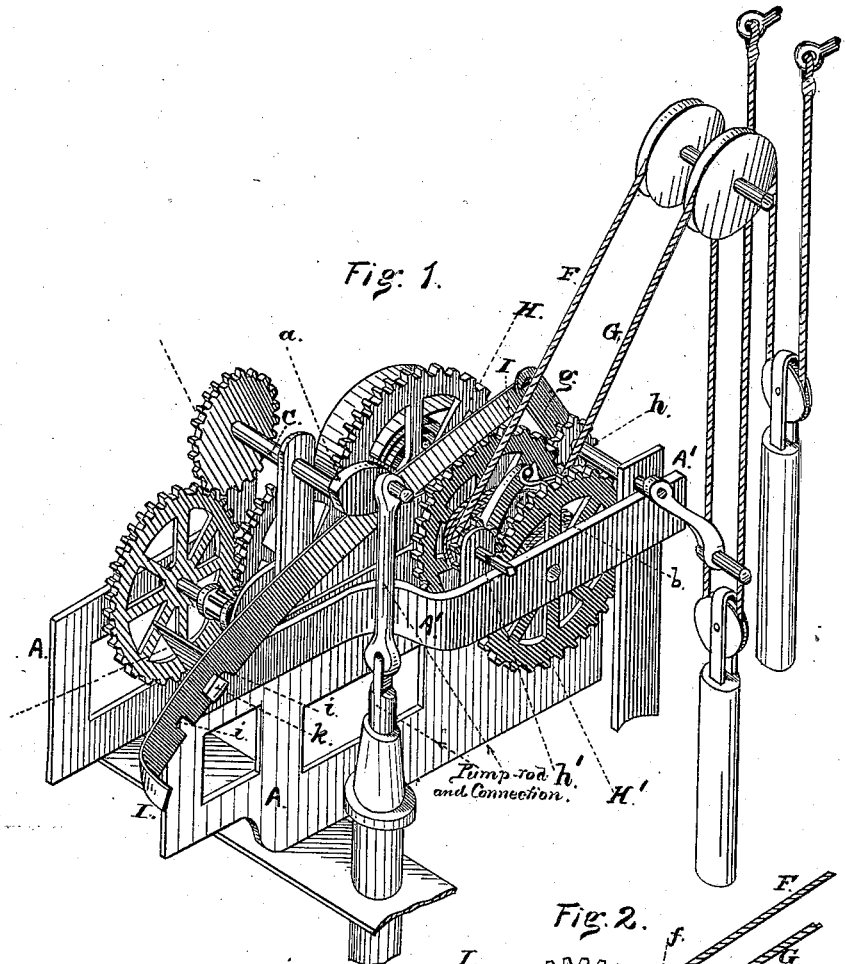
Figure 2:
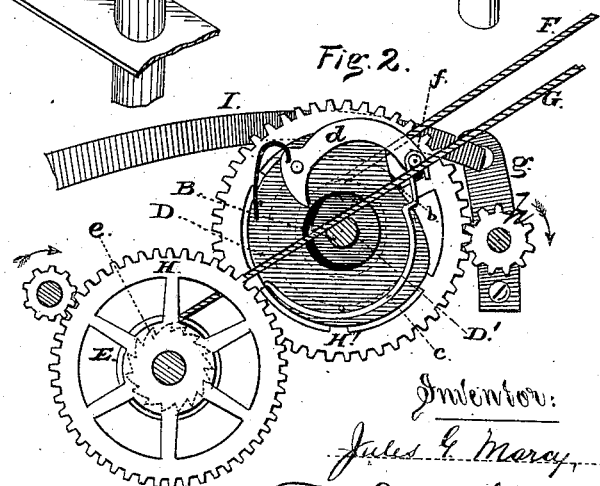

Referring to the accompanying drawings, Figure 1 is a view, in isometrical perspective, of my invention applied to a train of gearing for working a pump. Fig. 2 is an enlarged detail view of the main drum or driver and the auxiliary driver.

A A may represent any suitable frame for supporting the train of gears by which the power derived from the action of the springs or weights, or both, upon a principal shaft or arbor, B, is transmitted to a work-shaft, C. This shaft is provided with a crank, $a$, or when a belt is used the crank is replaced by a pulley.

Upon the end of the shaft B, or against the face of the drum $b$, I fix and secure a disk, D, upon which I place a pivoted dog, $d$, in a position to properly engage with a ratchet-wheel, $e$, provided upon the side of the auxiliary drum E, or else fixed to the end of the drum-shaft, and I support the shaft in the frame A', so that it shall be in line with the principal shaft B, and its ratchet-wheel $e$ shall run in the circular opening D' at the center of the disk, and in working position with the point of the dog. This dog and the ratchet-wheel form a means for locking together the main drum or shaft and the auxiliary driver, and I provide the dog with a catch-spring for holding it back out of engagement with the ratchet-wheel whenever one drum is to be disconnected from the other.

The principal drum, with its disk and locking-dog, and the auxiliary drum, with its ratchet-wheel, are both clearly shown in Fig. 2 of the drawings. The catch there shown for holding back the dog consists of a bent spring, $c$, fixed at one end, and having the other free end bent into a loop to engage with a pin or knob, $f$, on the end of the longer arm of the dog $d$. According as the knob is placed in one or the other of the bends of this end of the wire, the dog is held either up out of play or down against its ratchet-wheel.

The main drum and the disk fixed thereto are driven by the cord and weight F, while the auxiliary drum is rotated by the cord and weight G, and both are wound up as often as required by means of the gear-wheels H H' and the winding-pinions $h$, provided for this purpose. Either one can be wound up separately from the other, or by locking the two drums together they may be wound by the one pinion $h$, as in starting the machine. I mount one end of the shaft of this pinion $h$ in a movable bearing, $g$, held in place by a locking-bar, I, and either in or out of working-line with the gear-wheel, so that the pinion can be thrown out of action after the winding is performed. This bar I is locked in both positions by the latch $k$ and notches $i\ i$.

$h'$ is a shaft, by the application to which of a key the mechanism is wound up to set the motor in running order.

Having thus described my invention, what I claim, and desire to secure by Letters Patent, is—

In a mechanical motor having a driving-shaft geared into a work shaft or arbor by a train of gears, substantially as described, the combination, with the principal drum or shaft having the disk provided with the locking-dog $d$, of the auxiliary drum E, having the ratchet-wheel $e$, and mounted in line with said principal shaft B, substantially as herein described, for the purposes set forth.

Witness my hand and seal.

JULES G. MARCY. [L. S.]

In presence of—
 EDWARD E. OSBORN,
 W. F. CLARK.